US011843537B2

(12) United States Patent
Trujillo et al.

(10) Patent No.: US 11,843,537 B2
(45) Date of Patent: Dec. 12, 2023

(54) TELECOMMUNICATION SERVICE PROVIDER CONTROLLING AN UNDERLAY NETWORK IN CLOUD SERVICE PROVIDER ENVIRONMENT

(71) Applicant: DISH Wireless L.L.C., Englewood, CO (US)

(72) Inventors: Andrew Trujillo, Littleton, CO (US); Ash Khamas, Goffstown, NH (US); Sundeep Goswami, Leesburg, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/101,067

(22) Filed: Jan. 24, 2023

(65) Prior Publication Data

US 2023/0336475 A1 Oct. 19, 2023

Related U.S. Application Data

(60) Provisional application No. 63/331,121, filed on Apr. 14, 2022.

(51) Int. Cl.
*H04L 45/64* (2022.01)
*H04L 12/46* (2006.01)

(52) U.S. Cl.
CPC .......... *H04L 45/64* (2013.01); *H04L 12/4633* (2013.01)

(58) Field of Classification Search
CPC .............................. H04L 45/64; H04L 12/4633
See application file for complete search history.

(56) References Cited

U.S. PATENT DOCUMENTS

| 2020/0068639 | A1 | 2/2020 | Kim et al. | |
| 2020/0125389 | A1* | 4/2020 | Palermo | G06F 9/505 |
| 2022/0014963 | A1 | 1/2022 | Yeh et al. | |
| 2022/0109622 | A1 | 4/2022 | Yeh et al. | |
| 2022/0158926 | A1* | 5/2022 | Wennerström | H04L 41/5019 |
| 2022/0286307 | A1* | 9/2022 | Thompson | H04M 15/8016 |
| 2023/0033048 | A1* | 2/2023 | Joshi | H04W 8/26 |

OTHER PUBLICATIONS

Shinde et al., "A network operator-biased approach for multi-service network function placement in a 5G network slicing architecture," *Computer Networks* 201:108598, 2021 (16 pages).
"3rd Generation Partnership Project; Technical Specification Group Radio Access Network; NG-RAN; Architecture Description (Release 16)," 3GPP TS 38.401 V16.8.0, Dec. 2021, 79 pages.

* cited by examiner

*Primary Examiner* — Azizul Choudhury
(74) *Attorney, Agent, or Firm* — SEED INTELLECTUAL PROPERTY LAW GROUP LLP (57) ABSTRACT

Embodiments are directed towards systems and methods for enabling a telecommunication service provider to control an underlay network in cloud service provider environment. One such method includes: dictating control of the underlay network to a telecommunication service provider in the cloud service provider environment; enabling control of a number of virtual routers to be deployed by the telecommunication service provider in the cloud service provider environment; and managing route tables for the virtual routers deployed by the telecommunication service provider in the cloud service provider environment. In some embodiments, the Virtual Private Cloud design is configured to be similar to a design of the on-prem architecture of the telecommunication service provider.

18 Claims, 8 Drawing Sheets

TELECOMMUNICATION SERVICE PROVIDER CONTROLLING AN UNDERLAY NETWORK IN CLOUD SERVICE PROVIDER ENVIRONMENT

TECHNICAL FIELD

The present disclosure relates generally to telecommunication networks, more particularly, to controlling an underlay networks.

BRIEF SUMMARY

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in Telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNB)) connected to the 5G core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Briefly stated, one or more methods for enabling a telecommunication service provider to control an underlay network in cloud service provider environment are disclosed. Such methods include: providing, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; dictating control of the underlay network to a telecommunication service provider in the cloud service provider environment; enabling control of a number of virtual routers to be deployed by the telecommunication service provider in the cloud service provider environment; and managing route tables for the virtual routers deployed by the telecommunication service provider in the cloud service provider environment.

In some embodiments, the Virtual Private Cloud design is configured to be similar to a design of the on-prem architecture of the telecommunication service provider. In another aspect of some embodiments, the each Passthrough Edge Data Center has two connections to its closest Direct Connect location. In still another aspect of some embodiments, the each Passthrough Edge Data Center has two connections to its second closest Direct Connect location for diversity. In yet another aspect of some embodiments, the on-prem architecture of the telecommunication service provider has two connections to its closest Direct Connect location. In another aspect of some embodiments, the on-prem architecture of the telecommunication service provider has a dedicated circuit for Lab.

In other embodiments of the system for enabling a telecommunication service provider to control an underlay network in cloud service provider environment, the system uses 5G components for services in multiple target environments with full automation. In another aspect of such embodiments, the system uses native automation constructs instead of building overlay automation. In another aspect of such embodiments, the system uses a mix of cloud native APIs and existing telecom protocols.

In other embodiments, one or more systems for enabling a telecommunication service provider to control an underlay network in cloud service provider environment are disclosed. Such systems include: at least one memory that stores computer executable instructions; and at least one processor that executes the computer executable instructions to cause actions to be performed. Such actions include: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; dictate control of the underlay network to a telecommunication service provider in the cloud service provider environment; enable control of a number of virtual routers to be deployed by the telecommunication service provider in the cloud service provider environment; and manage route tables for the virtual routers deployed by the telecommunication service provider in the cloud service provider environment. In some embodiments, the Virtual Private Cloud design is configured to be similar to a design of the on-prem architecture of the telecommunication service provider.

Additionally, in other embodiments, one or more non-transitory computer-readable storage mediums are disclosed. The one or more non-transitory computer-readable storage mediums have computer-executable instructions stored thereon that, when executed by at least one processor, cause the at least one processor to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; dictate control of the underlay network to a telecommunication service provider in the cloud service provider environment; enable control of a number of virtual routers to be deployed by the telecommunication service provider in the cloud service provider environment; and manage route tables for the virtual routers deployed by the telecommunication service provider in the cloud service provider environment. In some embodiments, the Virtual Private Cloud design is configured to be similar to a design of the on-prem architecture of the telecommunication service provider.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, and the like. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
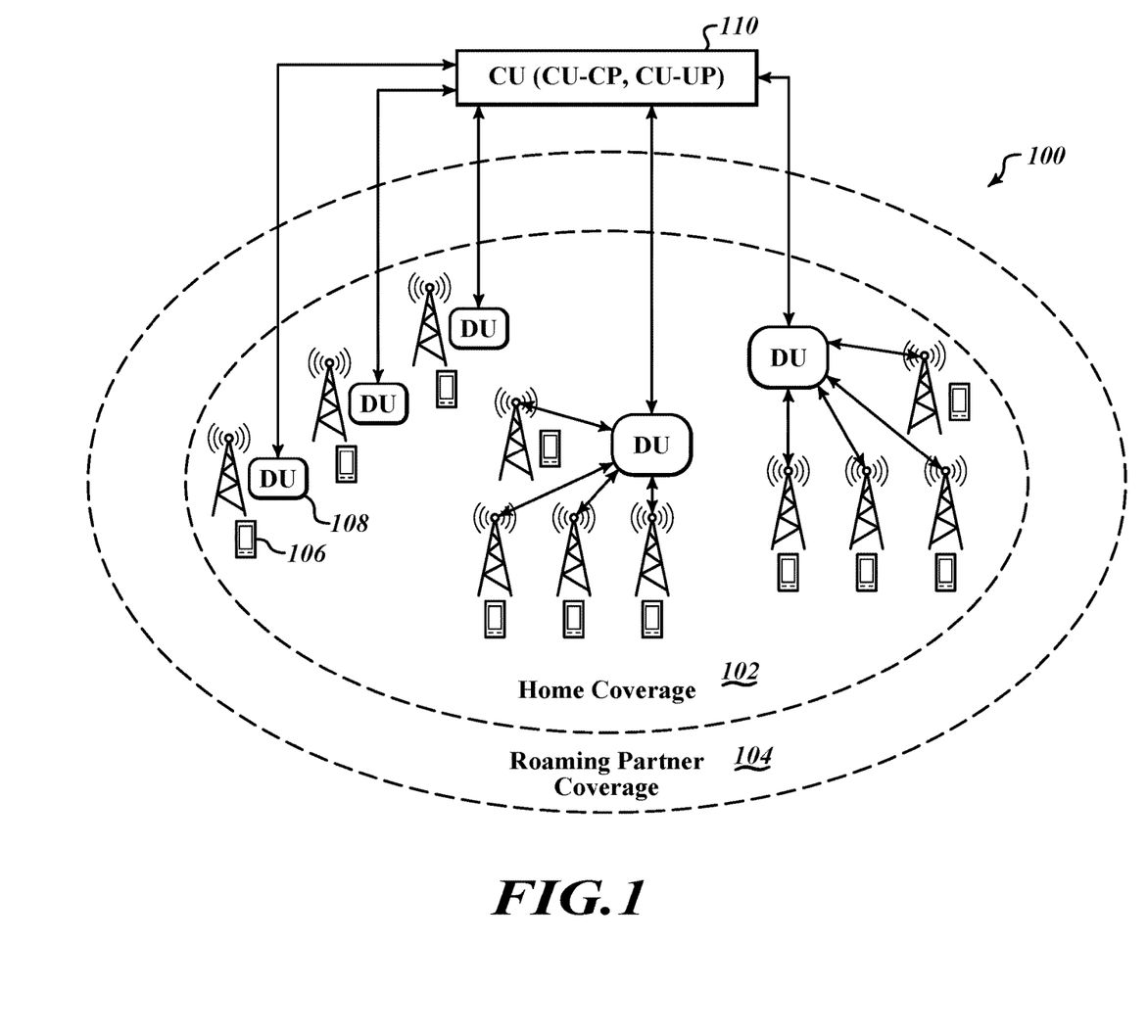
FIG. 1 illustrates a context diagram of a system that enables a telecommunication service provider to control an underlay network in cloud service provider environment may be implemented in accordance with embodiments described herein.

FIG. 1 illustrates a context diagram of a system that enables a telecommunication service provider to control an underlay network in cloud service provider environment implemented, in accordance with embodiments described herein.

A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
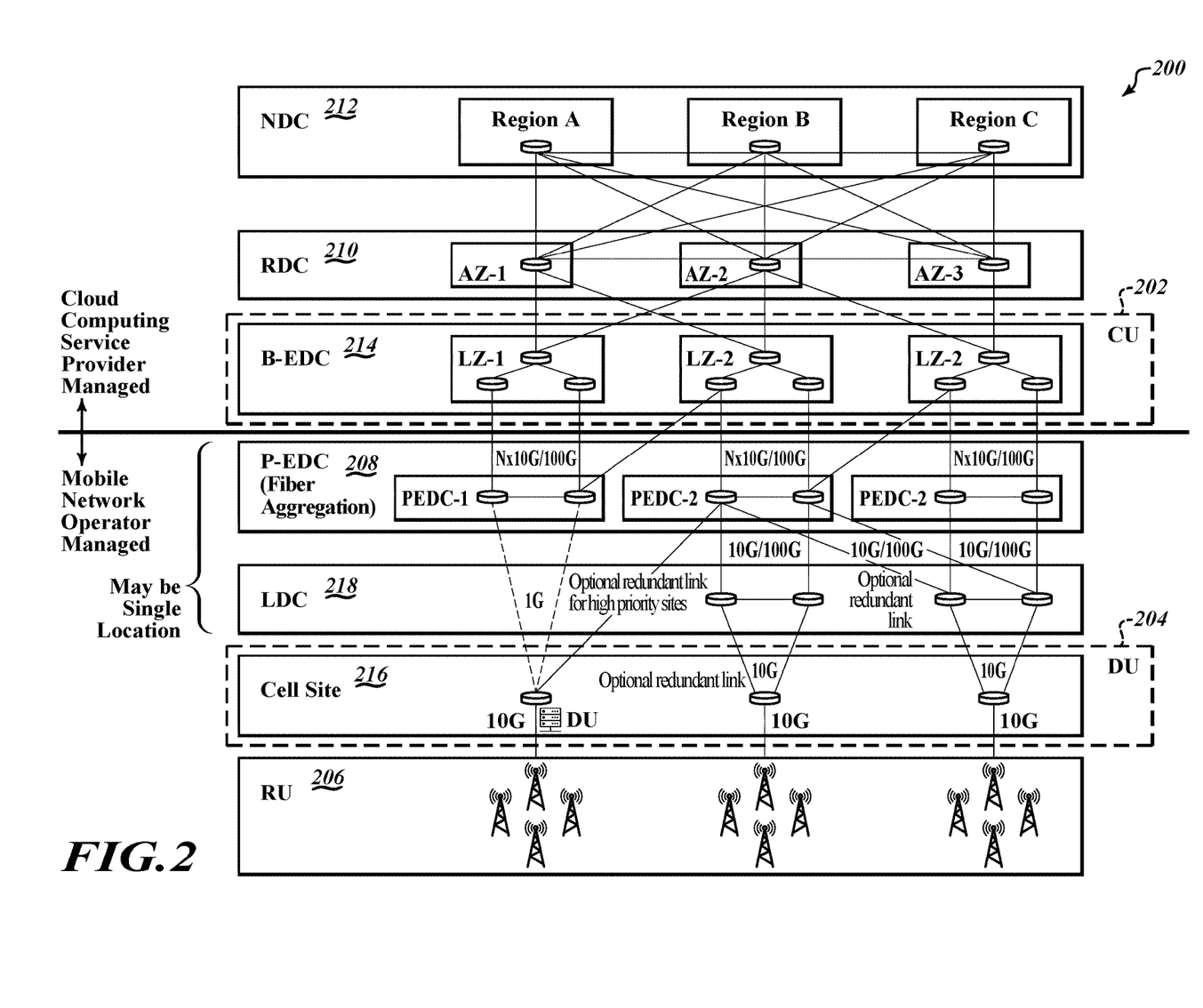
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP) respectively. A CU with multiple DUs will support multiple gNBs. The split architecture enables a 5G network to utilize different distribution of protocol stacks between CU 202 and DU 204 depending on midhaul availability and network design. The CU 202 is a logical node that includes the gNB functions like transfer of user data, mobility control, RAN sharing, positioning, session management etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
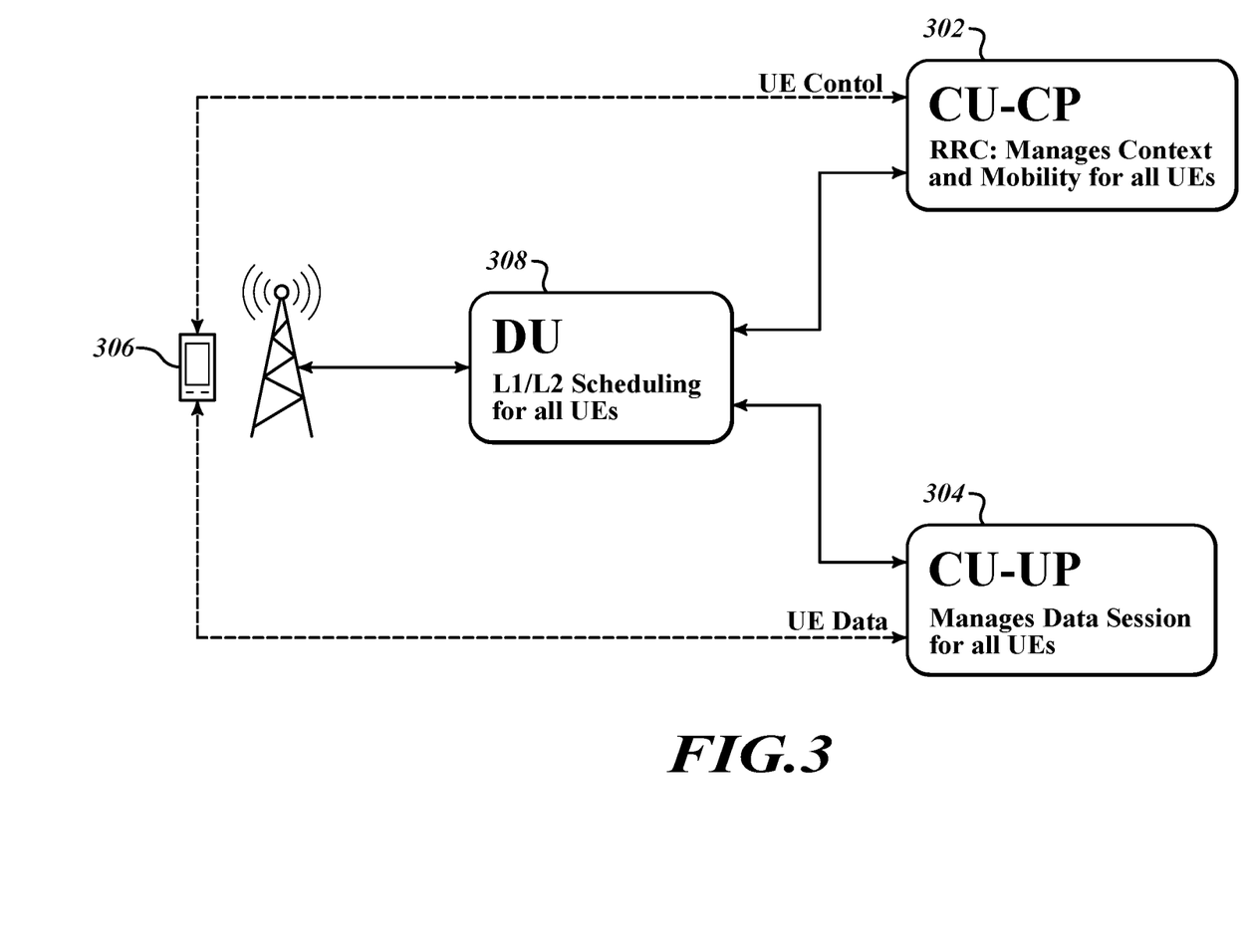
FIG. 3 illustrates a diagram showing connectivity between certain telecommunication network components during cellular telecommunication.

FIG. 3 is a diagram showing connectivity between certain telecommunication network components during cellular telecommunication in accordance with embodiments described herein.

The central unit control plane (CU-CP), for example of CU 110 of FIG. 1 or CU 202 of FIG. 2, primarily manages control processing of DUs, such as DU 308, and UEs, such as UE 302. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

Figure 4:
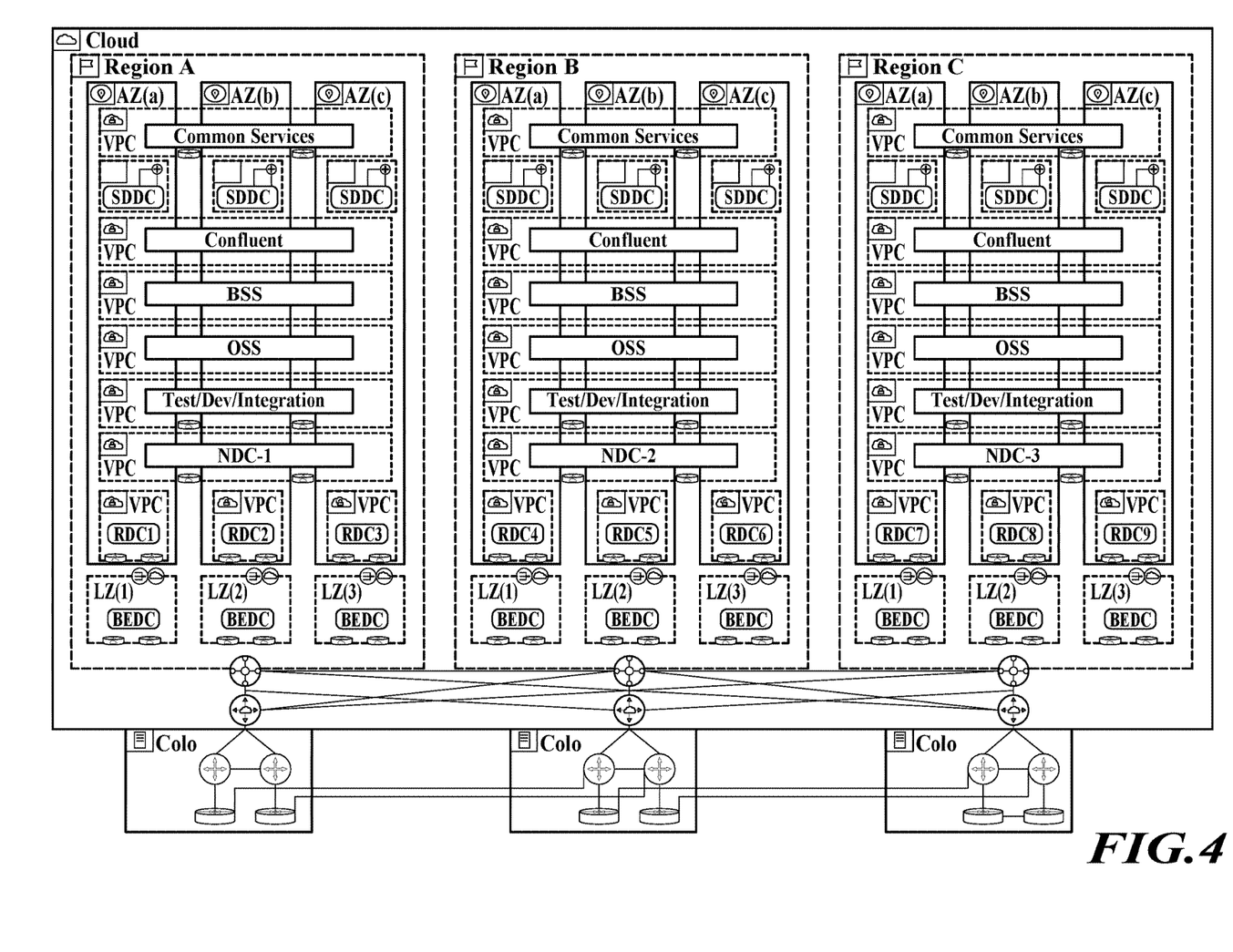
FIG. 4 illustrates a diagram of networking underlay with a Virtual Private Cloud design in a system that enables a telecommunication service provider to control an underlay network in cloud service provider environment.

Referring now to FIG. 4, a Networking Underlay architecture is shown for a Virtual Private Cloud (VPC) design in a system that enables a telecommunication service provider to control an underlay network in cloud service provider environment. An underlay network is the physical network responsible for the delivery of packets such as IP packets. A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channel) per user.

FIG. 4 displays one embodiment of VPCs used by the system that enables a telecommunication service provider to control an underlay network in cloud service provider environment. In some embodiments, this 5G network leverages the distributed nature of 5G cloud-native network functions and Cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), as shown in FIG. 4, to accommodate the distributed nature of 5G functions and the varying requirements for service layer integration. BEDCs are deployed in Local Zones hosting 5G NFs that have strict latency budgets. They are connected with Passthrough Edge Data Centers (PEDC), which serve as an aggregation point for all Local Data Centers (LDCs) and cell sites in a particular market. BEDCs also provide internet peering for 5G data service.

In the embodiment shown in FIG. 4, the NDCs host a nationwide global service such as OSS (Operating Support System) and BSS (Billing Support System). NDC is hosted in the Region and spans multiple AZs for high availability. For geographical diversity, in some embodiments, NDCs are mapped to Regions where three NDCs are built in three U.S. Regions (Region A, Region B, and Region C). An NDC is built to span across two AZs for high availability. Also shown in the network architecture displayed in FIG. 4 are DirectConnect Gateways, Transit Gateways, DirectConnect Routers, Internet Gateways, NAT Gateways, system routers, and virtual routers.

In one or more embodiment, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one of more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, three RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilizes a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of a system that enables a telecommunication service provider to control an underlay network in cloud service provider environment, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

In still another aspect of some embodiments of the system architecture, the regional data center VPCs are confined into a single AZ per region. In yet another aspect, the breakout edge data center includes two of more VPCs. These two of more VPCs may include Direct Connect (DX) Virtual Private Clouds and Internet Virtual Private Clouds.

In one aspect of some embodiments, the system architecture includes one dedicated Virtual Private Cloud per region. Software-Defined Data Center software may be implemented to the Cloud Infrastructure, which enables customers to run production applications across private cloud environments.

In still another aspect of some embodiments of the system architecture, a transit gateway (TGW) is dedicated to each environment. A transit gateway is a network transit hub that may be used to interconnect virtual private clouds (VPCs) with on-premises networks. In yet another aspect of some embodiments, the transit gateway (TGW) enables peering between regions. Such Inter-Region VPC Peering enables VPC resources like EC2 instances (e.g., virtual servers in an Elastic Compute Cloud (EC2) for running applications), Relational Database Service (RDS) databases and Lambda functions (e.g., server-less compute services that run code in response to events and automatically manage underlying compute resources) running in different regions to communicate with each other using private IP addresses, without requiring gateways, VPN connections, or separate network appliances.

In some embodiments of the network architecture, each traffic from virtual routers is encapsulated using Generic Routing Encapsulation (GRE) tunnels, creating an Overlay Network. This leverages the Underlay network for end-point reachability. The Overlay network uses Intermediate Systems to Intermediate Systems (IS-IS) routing protocol in conjunction with Segment Routing Multi-Protocol Label Switching (SR-MPLS) to distribute routing information and establish network reachability between the virtual routers. Multi-Protocol Border Gateway Protocol (MP-BGP) over GRE is used to provide reachability from on-prem to Overlay network and reachability between different regions in the cloud. The combined solution provides the ability to honor requirements, such as traffic isolation and efficiently route traffic between on-prem, and 3rd parties (e.g., voice aggregators, regulatory entities, and the like).

Figure 5:
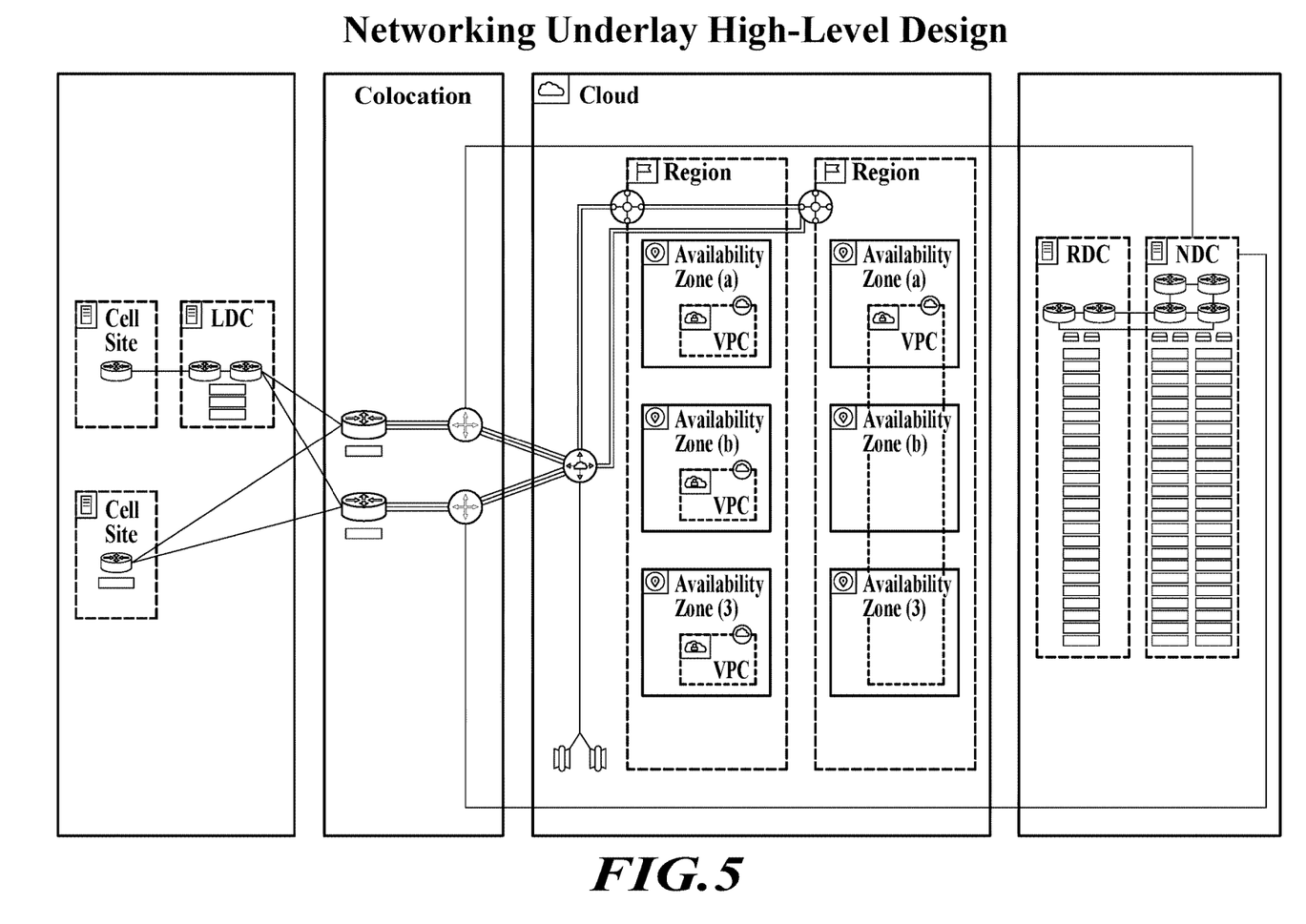
FIG. 5 illustrates a diagram of networking underlay with a Breakout Edge Data Center in a system that enables a telecommunication service provider to control an underlay network in cloud service provider environment.

Referring now to FIG. 5, in some embodiments of the network architecture, the VPC enables the launch of CNF resources on a virtual network. This virtual network is intended to closely resemble an on-premises network, but also contains all the resources needed for Data Center functions. In one or more embodiment, the VPCs hosting each of the DCs are interconnected utilizing global network and Transit Gateway. In another aspect, the Transit Gateway is used in Regions to provide connectivity between VPCs deployed in the NDCs, RDCs, and BEDCs with scalability and resilience.

In one aspect of some embodiments, the Direct Connect location provides connectivity from RAN DUs (on-prem) to Local Zones where cell sites are homed. Cell sites are mapped to a particular Local Zone based on proximity to meet 5G RAN mid-haul latency expected between DU and CU.

In some embodiments, each Region hosts one NDC and three RDCs. The NDC functions communicate to each other through the Transit Gateway, where each VPC has an attachment to the specific regional Transit Gateway. EC2 and native networking is referred to as "Underlay Network" in this network architecture. Provisioning of Transit Gateway and required attachments are automated using CI/CD pipelines with AWS APIs. Transit Gateway routing tables are utilized to maintain isolation of traffic between functions.

In another aspect of some embodiments, some of the 5G core network functions require support for advanced routing capabilities inside VPC and across VPCs (e.g., UPF, SMF and ePDG). These functions reply on routing protocols such as BGP for route exchange and fast failover (both stateful and stateless). To support these requirements, virtual routers are deployed on EC2 to provide connectivity within and across VPCs, as well as back to the on-prem network.

In some embodiments of telco-grade networks, resiliency drives the design configuration. Redundancy and resiliency are addressed at various layers of the 5G stack. Transport availability in failure scenarios is also discussed herein. High availability and geo-redundancy are NF dependent, while some NFs are required to maintain state.

In another aspect of some embodiments of NDCs, high availability and geo-redundancy are required. High availability is achieved by deploying two redundant NFs in two separate availability zones within a single VPC. Failover within an AZ can be recovered within the region without the need to route traffic to other regions. The in-region networking uses the underlay and overlay constructs, which enable on-prem traffic to seamlessly flow to the standby NF in the secondary AZ if the active NF becomes unavailable.

Geo-Redundancy is achieved by deploying two redundant NFs in two separate availability zones in more than one region. This is achieved by interconnecting all VPCs via inter-region Transit Gateway and leveraging v-router for overlay networking. The overlay network is built as a full-mesh enabling service continuity using the NFs deployed across NDCs in other regions (e.g., Markets, B-EDCs, RDCs, in Region A can continue to function using the NDC in Region B).

In some embodiments of RDCs, high availability and geo-redundancy are achieved by NFs failover between VPCs (multiple Availability zones) within one region. These RDCs are interconnected via Transit Gateway with the v-router-based overlay network. This provides on-premise and B-EDC reachability to the NFs deployed in each RDC with route policies in place to ensure traffic only flows to the backup RDCs, if the primary RDC becomes unreachable.

In another aspect of some embodiments of PEDCs, a RAN network is connected, through PEDC, to two different direct connect locations for reachability into the region and local zone This allows for DU traffic to be rerouted from an active BEDC to backup BEDC in the event a local zone fails.

Figure 6A:
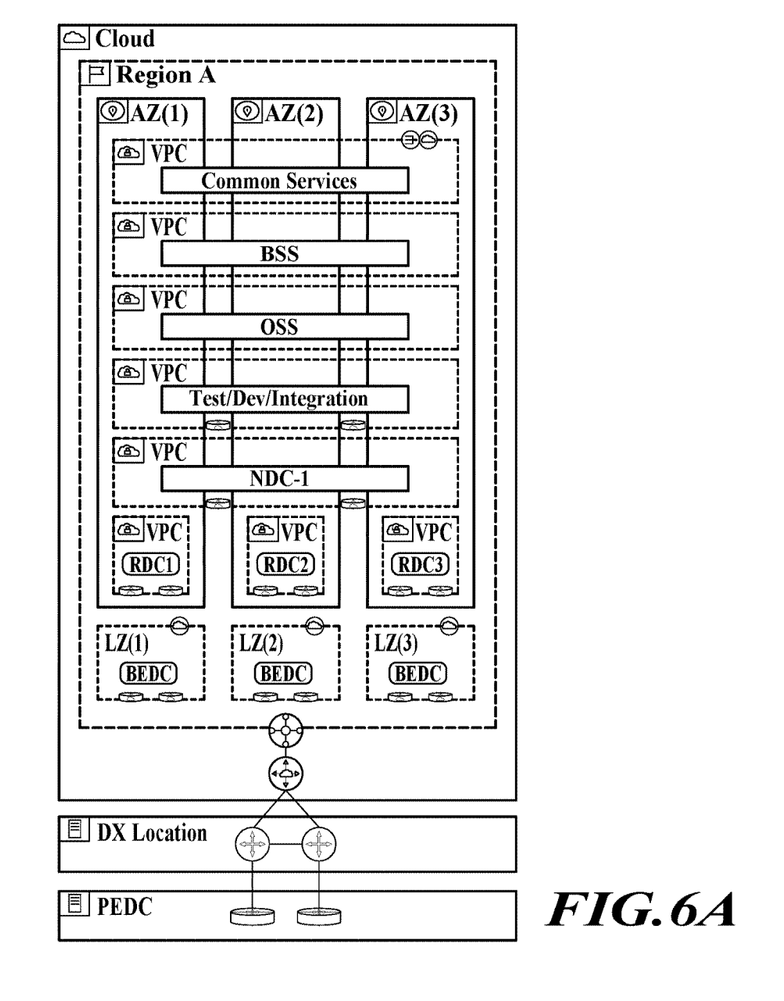
FIG. 6A illustrates a diagram of a 5G cloud computing network architecture in a system that enables a telecommunication service provider to control an underlay network in cloud service provider environment.

Referring now to FIG. 6A, an embodiment is shown of 5G cloud computing network architecture for a system that enables a telecommunication service provider to control an underlay network in cloud service provider environment. In some such embodiments, each Passthrough Edge Data Center has two connections to its closest Direct Connect location. In another aspect, each Passthrough Edge Data Center has two connections to its second closest Direct Connect location for diversity. In still another aspect of some embodiments, the on-prem architecture of the telecommunication service provider has two connections to its closest Direct Connect location. In yet another aspect of some embodiments, the on-prem architecture of the telecommunication service provider has a dedicated circuit for Lab.

In one or more embodiments, the network architecture uses 5G components for services in multiple target environments with full automation. In another aspect of some embodiments, the network architecture uses native automation constructs instead of building overlay automation. In still another aspect of some embodiments, the network architecture uses a mix of cloud native APIs and existing telecom protocols.

Figure 6B:
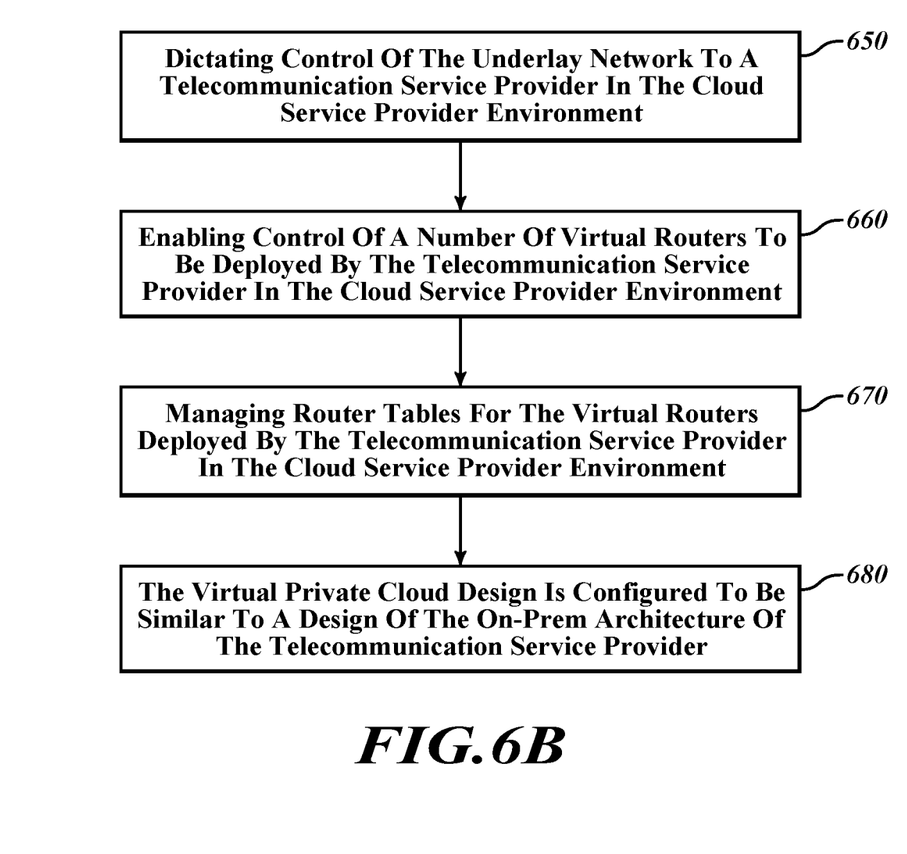
FIG. 6B is a logic diagram showing a telecommunication service provider controlling an underlay network in cloud service provider environment.

Referring now to FIG. 6B a logic diagram is shown that displays a method for enabling a telecommunication service provider to control an underlay network in cloud service provider environment. At operation 650, control of the underlay network is dictated to a telecommunication service provider in the cloud service provider environment. At operation 660, control of a number of virtual routers is enabled to be deployed by the telecommunication service provider in the cloud service provider environment. At operation 670, route tables are managed for the virtual routers deployed by the telecommunication service provider in the cloud service provider environment. In some embodiments, optional operation 680 is included, in which the Virtual Private Cloud design is configured to be similar to a design of the on-prem architecture of the telecommunication service provider.

Figure 7:
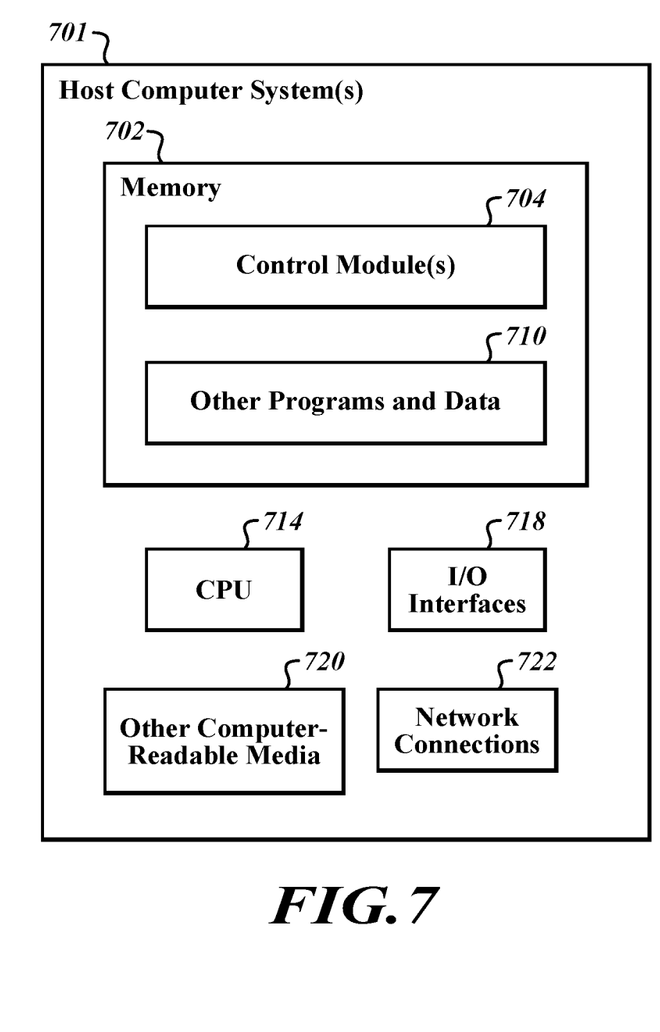
FIG. 7 shows a system diagram that describes an example implementation of a computing system(s) for implementing embodiments described herein.

FIG. 7 shows a system diagram that describes an example implementation of a computing system(s) for implementing embodiments described herein. The functionality described herein for a system that enables a telecommunication service provider to control an underlay network in cloud service provider environment, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 701. For example, such computer system(s) 701 may represent those in various data centers and cell sites shown and/or described herein that host the functions, components, microservices and other aspects described herein to implement a system that enables a telecommunication service provider to control an underlay network in cloud service provider environment. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for a system that enables a telecommunication service provider to control an underlay network in cloud service provider environment. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for enabling a telecommunication service provider to control an underlay network in cloud service provider environment, the method comprising:
   providing, by a mobile network operator, a distributed unit (DU) of a fifth-generation (5G) cellular telecommunication network radio access network (RAN) that is served by a particular 5G cellular site base station, wherein the DU:
      is associated with a primary 5G Node B (gNB) identified by a primary identifier (ID);
      is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID; and
      is operable to communicate via one or more passthrough edge data centers, each of the one or more passthrough edge data centers having two connections to its closest direct connect location;
   dictating control of the underlay network to a telecommunication service provider in the cloud service provider environment;
   enabling control of a number of virtual routers to be deployed by the telecommunication service provider in the cloud service provider environment; and
   managing route tables for the virtual routers deployed by the telecommunication service provider in the cloud service provider environment.

2. The method of claim 1 wherein a Virtual Private Cloud design is configured to be similar to a design of the on-prem architecture of the telecommunication service provider.

3. The method of claim 1, wherein each Passthrough Edge Data Center has two connections to its second closest Direct Connect location for diversity.

4. The method of claim 1, wherein the on-prem architecture of the telecommunication service provider has two connections to its closest Direct Connect location.

5. The method of claim 1, wherein the on-prem architecture of the telecommunication service provider has a dedicated circuit for Lab.

6. The method of claim 1, further comprising: using 5G components for services in multiple target environments with full automation.

7. The method of claim 1, further comprising: using native automation constructs instead of building overlay automation.

8. The method of claim 1, further comprising: using a mix of cloud native APIs and existing telecom protocols.

9. A system for enabling a telecommunication service provider to control an underlay network in cloud service provider environment, the system comprising:
   at least one memory that stores computer executable instructions; and
   at least one processor that executes the computer executable instructions to cause actions to be performed, the actions including:

provide, by a mobile network operator, a distributed unit (DU) of a fifth-generation (5G) cellular telecommunication network radio access network (RAN) that is served by a particular 5G cellular site base station, wherein the DU:
  is associated with a primary 5G Node B (gNB) identified by a primary identifier (ID);
  is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID; and
  is operable to communicate via one or more passthrough edge data centers, each of the one or more passthrough edge data centers having two connections to its closest direct connect location;
dictate control of the underlay network to a telecommunication service provider in the cloud service provider environment;
enable control of a number of virtual routers to be deployed by the telecommunication service provider in the cloud service provider environment; and
manage route tables for the virtual routers deployed by the telecommunication service provider in the cloud service provider environment.

10. The system of claim 9, wherein a Virtual Private Cloud design is configured to be similar to a design of the on-prem architecture of the telecommunication service provider.

11. The system of claim 9, wherein each Passthrough Edge Data Center has two connections to its second closest Direct Connect location for diversity.

12. The system of claim 9, wherein the on-prem architecture of the telecommunication service provider has two connections to its closest Direct Connect location.

13. The system of claim 9, wherein the on-prem architecture of the telecommunication service provider has a dedicated circuit for Lab.

14. The system of claim 9, further comprising: using 5G components for services in multiple target environments with full automation.

15. The system of claim 9, further comprising: using native automation constructs instead of building overlay automation.

16. The system of claim 9, further comprising: using a mix of cloud native APIs and existing telecom protocols.

17. A non-transitory computer-readable storage medium having computer-executable instructions stored thereon that, when executed by at least one processor, cause the at least one processor to cause actions to be performed, the actions including:
provide, by a mobile network operator, a distributed unit (DU) of a fifth-generation (5G) cellular telecommunication network radio access network (RAN) that is served by a particular 5G cellular site base station, wherein the DU:
  is associated with a primary 5G Node B (gNB) identified by a primary identifier (ID);
  is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID; and
  is operable to communicate via one or more passthrough edge data centers, each of the one or more passthrough edge data centers having two connections to its closest direct connect location;
dictate control of an underlay network to a telecommunication service provider in a cloud service provider environment;
enable control of a number of virtual routers to be deployed by the telecommunication service provider in the cloud service provider environment; and
manage route tables for the virtual routers deployed by the telecommunication service provider in the cloud service provider environment.

18. The non-transitory computer-readable storage medium of claim 17, wherein a Virtual Private Cloud design is configured to be similar to a design of the on-prem architecture of the telecommunication service provider.

* * * * *